United States Patent [19]

Sudoh et al.

[11] 3,860,763

[45] Jan. 14, 1975

[54] AUTOMATIC EXCLUSION CIRCUIT FOR A KEY TELEPHONE SET

[75] Inventors: Kengo Sudoh; Mikihiro Ichikawa, both of Kawasaki, Japan

[73] Assignees: Nippon Tsu Shin Kogyo K.K., Kawasaki-shi, Japan; TIE/Communications Inc., Stamford, Conn.

[22] Filed: Apr. 5, 1973

[21] Appl. No.: 348,313

[30] Foreign Application Priority Data

Jan. 13, 1973 Japan .............................. 48/12510

[52] U.S. Cl. .............................. 179/18 DA, 179/99

[51] Int. Cl. .............................. H04m 1/70

[58] Field of Search .. 179/18 DA, 99, 17 B, 18 AD, 179/39

[56] References Cited

UNITED STATES PATENTS

| | | | |
|---|---|---|---|
| 3,514,544 | 5/1970 | Chambers, Jr. | 179/17 B |
| 3,591,725 | 7/1971 | Morse et al. | 179/18 AD |
| 3,725,601 | 4/1973 | Jetzt | 179/99 |

*Primary Examiner*—Thomas A. Robinson
*Attorney, Agent, or Firm*—Kenyon & Kenyon Reilly Carr & Chapin

[57] ABSTRACT

An exclusion circuit for a key telephone set is disclosed, comprised of means for preventing a key telephone set from being connected to either an intercom line circuit or a central office line circuit which is being used by at least one other key telephone. Means are also provided to permit a user of either an intercom or central office line, to temporarily remove the guarded condition, permitting other key telephone sets to connect to the line circuit in use. After the connection of the additional key telephone set or sets, the guarded condition is restored, thereby preventing other unwanted key telephone sets from connecting to the occupied line circuit.

10 Claims, 1 Drawing Figure

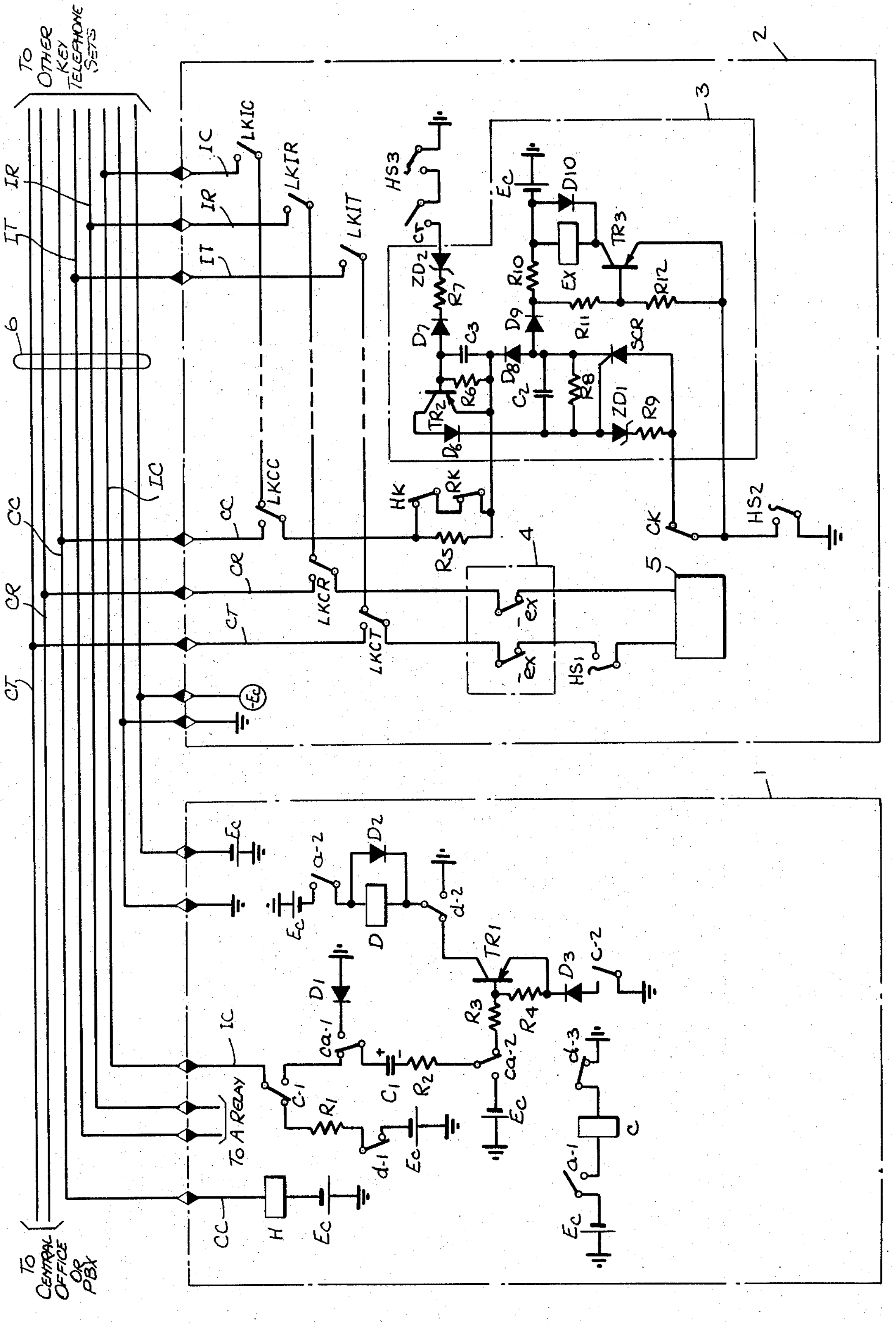
TO OTHER KEY TELEPHONE SETS
TO CENTRAL OFFICE OR PBX
TO A RELAY
IC
IR
IT
CC
CR
CT
LKIC
LKIR
LKIT
LKCC
LKCR
LKCT
HS1
HS2
HS3
HK
RK
CK
EX
SCR
TR1
TR2
TR3
Ec

AUTOMATIC EXCLUSION CIRCUIT FOR A KEY TELEPHONE SET

BACKGROUND OF THE INVENTION

The invention relates in general to an exclusion circuit for a telephone system; more particularly it relates to an exclusion circuit for use on both a central office of PBX line circuit, and an intercom line circuit of a key telephone system.

In a key telephone system, it is desirable to design the system to permit each key telephone set to be connected to one of plural central office or PBX line circuits by raising the handset, and depressing the desired central office line key button. Further, it is desirable to design the system to permit each key telephone set to be connected for conversation to any other key telephone set in the system by an intercom line circuit by raising the handset, depressing the appropriate intercom line key button and dialling the appropriate number for the other set.

In addition, it is desirable in a key telephone system to automatically exclude all other key telephones from a central office or intercom line circuit when the line circuit is connected to one or more of the sytem's sets. Further it is also desirable to permit this exclusion feature to be defeated at the option of the party connected to the particular line circuit, to permit one or more other key telephone users to join in on the line circuit and then prevent the connection of other key telephone sets to the particular line circuit then in use.

It is, therefore, an object of the present invention to design a key telephone system exclusion circuit by which calls may be made and received on a key telephone set to a central office switching means while preventing other key telephone set users from overhearing the conversation by connecting to the "busy" central office line circuit means.

It is an additional object of the present invention to design a key telephone system exclusion circuit by which intercom calls may be made and received between two key telephone sets while preventing other key telephone set users from overhearing the conversation on the intercom line means by connecting to a "busy" intercom line circuit means.

A further object of the present invention is to design the key telephone system exclusion circuit so that the user of the central office line circuit means has the capability of defeating the exclusion circuit and permitting others to connect into the line circuit for a conference call.

A further final objective of this invention is to provide the capability in the exclusion system for the users to exclude further key telephone sets from the line circuit means once a central office conference call is established.

These and other objects are accomplished in this invention by providing an exclusion circuit in a key telephone set comprised of means for selectively connecting a key telephone set to a central office or intercom line circuit means; means for testing the status of the selected line circuit means to produce a first output signal indicating when a selected line circuit means is idle and a second output signal indicating when the selected line circuit is in use, and means responsive to the output signals of said testing means for permitting or preventing connection of the telephone in response to the idle or busy conditions respectively. Means are also provided for temporarily defeating the exclusion circuit, thereby permitting one or more additional key telephone sets to connect to the central office or intercom line circuit already in use, and means for automatically restoring the exclusion circuit to normal operation after the desired key telephone sets are connected to the particular line circuit.

The specific preferred embodiment disclosed herein for carrying out the present invention employs a silicon controlled rectifier circuit means to test the voltage condition of a central office or an intercom line control circuit means. The response of the silicon controlled rectifier circuit means to the state of the particular line control circuit means is then used to control the current in a transistor circuit means used to drive an exclusion relay, through the contacts of which the key telephone set's network is connected to or disconnected from the line circuit means in response to the voltage condition of the line's control circuit means. In addition, an exclusion defeating means comprising a key and associated circuitry is provided at each key telephone set, permitting the user of the line circuit to control the silicon controlled rectifier circuit means in other key telephone sets, thereby allowing or preventing connection to the line circuit then in use.

BRIEF DESCRIPTION OF THE DRAWING

The objects and features of the present invention will be better understood by reference to the detailed description which follows when considered together with the accompanying drawing showing a schematic circuit diagram of a preferred embodiment for carrying out this invention.

DETAILED DESCRIPTION OF THE PREFERRED EMBODIMENT

In the accompanying drawing, only the components of a key telephone system essential to illustrate the operation of the invention are shown and the drawing is not to be understood as representing an entire key telephone system or set.

As shown in the drawing a key service unit is contained within the broken line 1. The key service unit 1 is connected to each key telephone set (represented by the circuits within the broken line 2) by a central office line control lead CC. Additionally, each key set 2 is parallel connected to a central office, PBX, or other switching circuit (hereafter referred to as "central office circuit") by conventional tip and ring leads CT and CR. Similarly, each key telephone set 2 in the system is connected to the key service unit 1 by an intercom line control lead IC, and intercom tip and ring leads IT and IR.

The coil of relay H, connected between the negative side of a common power supply Ec and the central office control lead CC, when operated, performs supervisory functions for the associated central office line within the key system. It should be understood that the power sources shown herein as batteries are not be construed as limiting the invention to operation with a battery, but other sources of power may equally as well be used.

The exclusion circuit of this invention is shown within broken line 3 with the contacts on exclusion relay EX within broken line 4. When exclusion relay EX is not operated, its two contacts *ex* connect a conventional telephone network 5, through hookswitch contact HS1 and the appropriately closed locking line key, LKC for a central office circuit, or LKI for an intercom line circuit. Cable 6 contains the tip and ring leads CT and CR for the central office line circuit, central office line control lead CC, key telephone system intercom tip and ring leads IT and IR and intercom line circuit control lead IC.

Relay A through its coil, (not shown in the drawing) is used to feed the key telephone system power source E*c* to the intercom line leads IT and IR. Relay C, together with relay A, operate at the commencement of an intercom line call, the former relay releasing when the answering relay, D, is operated by the intercom call being answered. Two or more key telephone sets 2 are parallel connected across intercom line leads IT, IR and IC. The contacts on relay C, A and D are shown in the drawing as contacts *c*, *a* and *d* respectively.

Contacts *ca* on relay CA (not shown) are operated during the dial impulse counting of an intercom call origination. In their operated position, contacts *ca* connect the power source E*c* through resistor R2 to capacitor C1, charging it as shown in the drawing through diode D1 and ground. As explained infra, when during an intercom call, contacts ca return to the position shown in the drawing, capacitor C1 places positive voltage on intercom control line IC.

Relay CR (not shown), in the key telephone set 2 receiving an intercom call, operates, closing contact cr, when the called intercom signalling is commenced.

In the drawing, all relays, contacts, line keys and circuits appear in their idle condition prior to the initiation of any calls.

With respect to the transistor circuits, TR1 is used to drive relay D when an intercom call is answered. TR2, when turned on, provides gating current to silicon controlled rectifier SCR in the exclusion circuit 3 when an intercom call from another key telephone set is answered. Transistor TR3 drives the exclusion relay EX to open contacts ex and exclude the key telephone set 2 from connecting to either busy central office leads CT, CR or busy intercom leads IT, IR.

Zener diodes ZD2 and ZD1 are used to prevent false turnon of the SCR when voltage drops in the key telephone system cables raise the voltage applied to the key telephone set 2 on leads CC and IC above their theoretical value.

HK is a contact on a non-locking hold key (not shown) for central office calls, RK is a contact on a non-locking exclusion defeating key (not shown). When either contact is operated, resistor R5 is placed in series with the central office control lead CC or the intercom control lead IC. CK is a contact which opens momentarily and then closes again whenever a line key is operated or released.

The functional operation of the exclusion circuit will now be explained for the various operations in a key telephone system.

When connection to a central office line circuit is required, and the office line connected by leads CT, CR and CC is not being used by any other key telephone set the party using key set 2 may, by pushing LKC and closing hookswitch contacts HS2, form a gate current path to SCR through R9, ZD1, the SCR, D8, contacts RK, HK, LKC, lead cc, and relay H to power source EC. Because the central office line is not already in use, the control lead CC is ungrounded and therefore, when this path is closed, the voltage across zener diode ZD1 exceeds its breakdown voltage causing current to flow through it and into the gate of the SCR. This turns the SCR on, grounding lead CC and operating relay H. The operation of relay H performs conventional supervisory functions in the key service unit.

Further, by the conduction of the SCR and diode D9, and the closing of HS2, the emitter and base of transistor TR3 are grounded, preventing TR3 from conducting. Thus relay EX is not operated and contacts ex remain closed, connecting the conventional telephone network 5 in key telephone set 2, through closed hookswitch HS1 to the central office leads CT and CR.

If the central office line circuit is being used at the time that the LKC and HS2 contacts close, the central office control lead CC is grounded by the using key telephone set. Therefore, when the second key telephone set user pushes LKC and closes hookswitch contact HS2, ZD1, which is itself grounded, does not conduct because of the ground on lead CC, and no gate current flows through ZD1 and the SCR. Thus the SCR does not turn ON. Consequently, the base of transistor TR3 is not grounded by diode D9, transistor TR3 is turned ON by current through resistors R10, R11 and source Ec, collector current flows through relay EX, and relay EX operates, opening contacts *ex* and preventing the telephone network 5 from being connected across central office leads CT and CR. Thus by the operation of the exclusion circuit of this invention, a second key telephone set 2 is prevented from entering a central office line circuit in use by another key telephone set.

In the event the user of the central office line circuit wishes to permit a second key telephone set 2 to connect into the central office line circuit in use, because of the operation of the exclusion circuit of this invention, the party using the central office line has exclusive control over this operation. Even if the line key contacts LKC and the hookswitch contacts HS2 are closed, the second set will not be connected to the line because the EX relay in the second key set will operate, its *ex* contacts opening and preventing the connection of telephone network 5 in the second key telephone set to leads CT and CR.

If, however, the user of the central office line circuit pushes his exclusion circuit defeat or release key, opening contact RK, resistor R5 is placed in series with central office control lead CC. This removes the direct ground on lead CC, dividing the voltage of EC between the coil resistance of relay H and resistor R5. At this point, the user of the second key telephone set 2, who wishes to join the central office line circuit may, by closing the appropriate line key contacts LKC and closing hookswitch contact HS2, connect to the line because the voltage on lead CC is sufficient to break down ZD1 and turn on the SCR in this second key telephone set in the same manner as would occur in connecting to an idle line.

This occurs because line CC was permitted to reach a negative voltage by the addition of resistor R5 in series with relay coil H when contact RK was opened in the first key telephone. During this sequence, the SCR in the first key telephone is not affected by the voltage variations in the circuit because a path for the SCR current is formed through diode D9 and resistor R10 to power source E*c*.

To make a call on an idle intercom line, the circuit functions as follows:

When the line key is pressed, closing LKI, and the hookswitch contacts HS1 and HS2 are closed, because the intercom control lead IC is not grounded by another key telephone set, gate current flows through the SCR of the key telephone set via the path R9, ZD1, SCR, D8, RK, HK, LKI, line IC, contact *c*-1 break, R1, contact *d*-1 and the negative terminal of power source Ec. This turns the SCR ON, grounding the base of transistors TR3 through D9 and turning TR3 OFF. As previously described, relay EX does not operate, contacts *ex* remain closed, and the telephone network 5 is connected to intercom leads IT and IR. The SCR grounds resistor R1, excluding all other sets. At this point, relay A operates and its contact *a*-1 is closed. This operates relay C through the circuit: ground, contact *d*-3, relay coil C, contact *a*-1, and power supply E*c*. With relay C operated, contact *c*-1 in the IC lead circuit opens the current path of the SCR through R1 in the key serivce unit 1. However, because of the alternate current path through diode D9 and resistor R10 to power supply E *c*, the SCR in the key telephone set is held ON, transistor TR3 is held OFF and relay EX is not operated, permitting the telephone network 5 to continue its connection to leads IT and IR making an intercom call possible. Meanwhile, since there is no negative potential connected to lead IC, other sets are still excluded from the line.

At this point, as the key telephone user dials to signal another key telephone, relay CA operates and its contacts *ca*-1 and *ca*-2 connect power source E*c* and ground through R2 and diode D1 to capacitor C1, charging it.

Because there is no discharge path for C1, it holds the charge when relay CA is released after dialing is completed. At this point relay CR of the called telephone set operates, closing contact *cr* in the called key telephone set. Further, when the person answers, raising the receiver, hookswitch contacts HS1 and HS2 close. By depressing his line key, contacts LKI are closed. Capacitor C1 then discharges through the path formed by the circuit: contact *c*-2 (relay C having operated at the beginning of the call), diode D3, the emitter-base junction of TR1, R3, contact *ca*-2 break, R2, Cl, contact *ca*-1 break, contact *c*-1 make, lead IC, LKI contact, contacts HK and RK, the emitter-base junction of TR2, diode D7, R7, Zener diode ZD2, contacts *cr* and HS3, and ground. The discharge current from C1 also flows in the emitter-collector circuit of TR2, through diode D6, SCR, D9, R10 and the battery E*c*. This current gates SCR, turning it ON, the SCR cathode current flowing through diode D9, resistor R10 and power supply E*c*. Transistor TR3 in the called key telephone is thereby turned OFF. Relay EX does not operate, and the telephone network 5 is connected to intercom lines IT and IR permitting conversation between both parties bridged across IT and IR. At the same time, the discharge of C1 turns transistor TR1 ON, operating relay D. The operation of relay D, through its contact *d*-3, releases relay C to produce an answer condition in the intercom line circuit. Contact *d*-1 keeps the IC lead circuit open after relay C releases so that there is no voltage to permit connection of another key telephone set. In this way an intercom line circuit is formed, and it is possible to have an exclusive intercom conversation between the two parties. Even if another key telephone user presses LKI, and closes hookswitch contacts HS1, HS2 and HS3, as explained above, no gate current will flow to the SCR in the key telephone set, the SCR cannot be turned ON, therefore permitting transistor TR3 to continue in the ON condition, operating relay EX, and disconnecting the telephone network 5 from the intercom leads IT and IR. Thus the exclusion condition is maintained.

As explained in detail above, it is possible in a key telephone system by the exclusion circuit of the present invention to have the capability of automatically excluding from both a central office line circuit and an intercom line circuit additional users who might attempt to connect to an existing conversation, while permitting momentary release of the exclusion circuit at the key telephone set under control of the first telephone user to thereby permit others to connect to the line while in a momentary idle state.

It is to be understood that the embodiment of the invention described herein is merely intended to illustrated the operative principles of the invention and is not to be considered as limiting the scope of the invention. Modifications may be made by those skilled in the art without departing from the spirit of the invention.

What is claimed is:

1. An automatic key telephone set exclusion circuit for use in a key telephone system having a plurality of key telephone sets wherein each key telephone set includes a telephone speech network circuit and at least one intercom line circuit means interconnecting said telephone sets, said exclusion circuit comprising an exclusion relay circuit means in each telephone set for controlling the connection of the key telephone speech network circuit to the intercom line circuit means;

indicating circuit means for producing an output signal indicating the condition of the line circuit means when connected to the line circuit means, said means producing a first output signal indicating when the line circuit means is idle and a second output signal indicating when the line circuit means is in use by at least one set; and means in each key telephone set, responsive to the first and second output signals of said indicating means, for connecting the telephone network circuit to the line circuit means in response to said first output signal and operating said exclusion relay means to block the connection of the telephone network circuit from the line circuit means in response to said second output signal.

2. An exclusion circuit as in claim 1 further comprising exclusion circuit release means connected to said telephone system for temporarily disabling the exclusion relay circuit means to permit the connection of an excluded telephone network circuit to an intercom line circuit means in use by other telephone sets.

3. An exclusion circuit for use in a key telephone system having a plurality of key telephone sets, wherein each key telephone set includes a telephone speech network circuit, at least one central office line circuit means connecting each telephone to a central office switching means, at least one intercom line circuit means interconnecting said key telephones and means for selectively connecting any key telephone network circuit to one of the line circuit means, said exclusion circuit comprising;

an exclusion relay circuit means in each telephone set for controlling the connection of the key telephone speech network circuit to the intercom line circuit means;

indicating circuit means, for producing an output signal indicating the condition of the line circuit means when connected to the line circuit means, said means producing a first output signal indicating when the selected line circuit means is idle, and a second output signal indicating when the selected line circuit means is in use by another telephone set; and means in each telephone set, responsive to the first and second output signals of said indicating means, for connecting another telephone network circuit to the selected line circuit means in response to said first output signal and operating said exclusion relay circuit means to exclude the connection of said telephone network circuit from the selected line circuit means in response to said second output signal.

4. An exclusion circuit for use in a key telephone system as in claim 3 further comprising an exclusion circuit release means connected to the key telephone system for temporarily disabling the exclusion relay circuit means to permit the connection of an excluded telephone network circuit to a line circuit means in use by another key telephone set.

5. An exclusion circuit for use in a key telephone system as in claim 4 wherein the exclusion circuit release means comprises a key switching means.

6. An exclusion circuit for use in a key telephone system as in claim 3 wherein;

the means for selectively connecting a key telephone to a line circuit comprises a line switching means having an output terminal connected to the telephone network circuit and a plurality of input terminals connected to the line circuits;

the means for producing an output signal indicating the condition of the line circuit means comprises 1. a line circuit control means connected between the input terminal of the switching means corresponding to the selected line circuit means and a power source, the voltage on said line circuit control means being dependent upon the status of the selected line circuit means,
2. a first semiconductor switching means connected to the output terminal of said line switching means, responding to the voltage of said line circuit control means to produce a first output signal indicating when the selected line circuit means is idle and a second output signal indicating when the selected line circuit means is in use; and the means responsive to both said first and second output signals, comprises a second semiconductor switching means responsive to the outputs of said first semiconductor switching means to produce an output, and the exclusion relay circuit means comprises a relay means responsive to the output of the second semiconductor switching means for connecting a key telephone network circuit to the selected line circuit means in response to the idle condition of the selected line circuit means and to disconnect a key telephone network circuit for the selected line circuit means in response to the busy condition of said circuit means.

7. An exclusion circuit for use in a key telephone system as in claim 6 wherein;

the line circuit control means is grounded when the selected line circuit means is being used and is at a predetermined voltage level when said line circuit means is idle;

the first semiconductor switching means is comprised of a silicon controlled rectifier circuit means switched on by the predetermined voltage on said line circuit control means, and not switched on by a ground signal on said line circuit control means;

said second semiconductor switching means is comprised of a transistor switching circuit connected to the output of the silicon controlled rectifier circuit means and is thereby switched off when said silicon controlled rectifier conducts and switched on when said silicon controlled rectifier is not turned on; and the exclusion relay circuit means is responsive to the transistor switching circuit and operates when said transistor means is on and does not operate when said transistor means is off, the contacts on said relay connecting the key telephone network circuit to the line circuit switching means when said relay is not operated and disconnecting said network circuit when said relay is operated.

8. An exclusion circuit for use in a key telephone system as in claim 3 wherein the selected line circuit means is an intercom line and;

the means for connecting a key telephone network circuit to another key telephone network circuit on the intercom line, comprises;

means responsive to the connection of said first key telephone to said intercom line control circuit means for disabling the exclusion circuit means within said second key telephone and connecting said second key telephone network circuit to said intercom circuit means; and means, connected to said intercom line control means, responsive to the connection of the second key telephone to the intercom line control circuit for preventing the connection of the network circuits of additional sets to said intercom line circuit means.

9. An exclusion circuit for use in a key telephone system as in claim 8 further comprising;

means for connecting additional key telephone sets to an intercom line circuit means in use by a plurality of key telephones, said means comprising:

an exclusion release key on the telephones connected to the intercom line and operable by the parties using the intercom line, means responsive to the operation of the exclusion release key for disabling the exclusion circuit means within said additional key telephone sets and for connecting said additional key telephone sets to said intercom line circuit means, and means connected to said intercom line control means responsive to the connection of said additional key telephone to the intercom line control circuit for preventing the connection of the network circuits of additional sets to said intercom line circuit means.

10. An exclusion circuit for use in a key telephone system as in claim 8 wherein the means for disabling said exclusion circuit is connected to the second key telephone and operates in response to the call signal initiated at the first operated key telephone set.

* * * * *